(No Model.)

J. W. FISHER.
CULINARY VESSEL.

No. 254,947. Patented Mar. 14, 1882.

Attest:
F. H. Schott
A. R. Brown

Inventor:
John W. Fisher
per J. O. Taskevatty

N. PETERS, Photo-Lithographer, Washington, D. C.

United States Patent Office.

JOHN W. FISHER, OF NEW YORK, ASSIGNOR OF ONE-HALF TO MICHAEL W. HAMMA, OF BROOKLYN, N. Y.

CULINARY VESSEL.

SPECIFICATION forming part of Letters Patent No. 254,947, dated March 14, 1882.

Application filed January 14, 1882. (No model.)

*To all whom it may concern:*

Be it known that I, JOHN W. FISHER, a citizen of the United States, residing at New York, in the county of New York and State of New York, have invented certain new and useful Improvements in Culinary Vessels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to that class of culinary vessels in which an inner vessel of earthenware or other suitable material is inclosed in an outer metallic casing, band, or ring, so as to form a space or chamber for the access of heat around and in contact with the walls of said inner vessel.

The object of the invention is to provide a simple means of securely attaching the inner vessel to its inclosing casing, band, or ring; and the invention consists in certain novel features of construction, as hereinafter more fully described and claimed.

Figure 1:
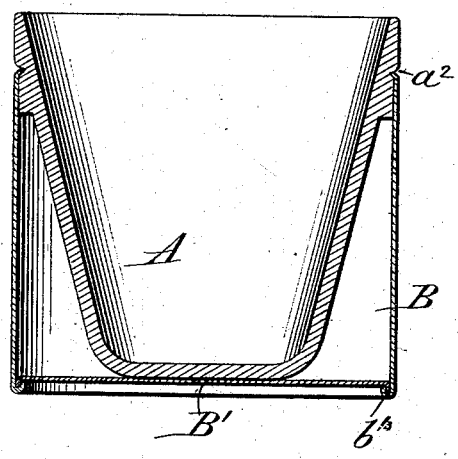
Figure 2:
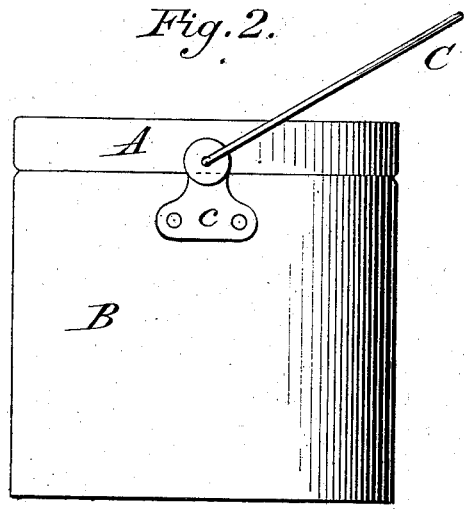
Figure 3:
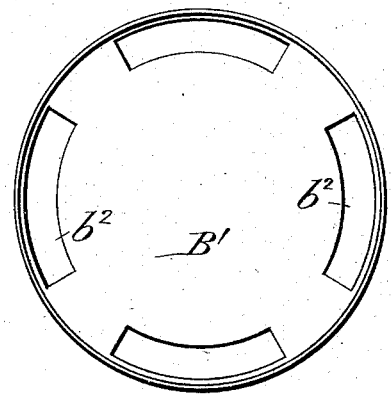
Figure 4:
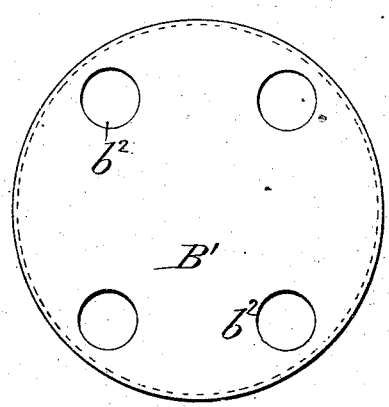
Figure 5:
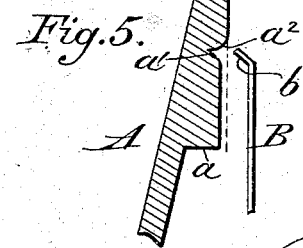

In the annexed drawings, which fully illustrate my invention, Figure 1 is a vertical section of a culinary vessel embodying my improvements. Fig. 2 is an exterior view of the same, showing the complete vessel provided with a bail. Figs. 3 and 4 are bottom views of the outer casing, showing perforations therein; and Fig. 5 is an enlarged sectional detail, illustrating the manner of connecting the inner vessel with its inclosing casing or band.

Like letters of reference indicate like parts.

The inner vessel or bowl, A, may be made of earthenware or other suitable material, and in any desired form, but is preferably tapered from above downward, as shown in Fig. 1. On the outer surface of this vessel or bowl, near or toward its upper part, is formed an annular shoulder, $a$, beyond which the outer surface of the bowl is continued vertically upward to an annular groove, $a'$, the upper part or side of which groove is of greater depth than the lower part and forms a slightly-curved shoulder, $a^2$. Above this upper shoulder, $a^2$, the outer surface of the bowl is again continued in a vertical line to the rim of the bowl. It will be observed that the circumference of the bowl above the shoulder $a^2$ is greater than it is between the groove and lower shoulder, $a$, thus forming a nearly even and continuous vertical surface on the outer side of the vessel when the inclosing band is in position, as shown by dotted line in Fig. 5.

The band B or wall of the outer inclosing casing is bent or turned inward at its upper edge, $b$, to engage within the annular groove $a'$ of the inner vessel or bowl. This band is fitted closely against the outer side of the bowl, above the shoulder $a$, and by means of the engagement of the projection or inwardly-bent edge $b$ within the groove $a'$ is held securely in contact with said bowl. It will be seen that a space is left within the casing B, between its vertical walls and the inclined sides of the bowl A, for the circulation of heat in contact with said bowl. The lower edge of the band B is curved inwardly and upwardly to form an annular groove or recess, $b'$, for the reception of a corresponding flange on the bottom B'. This bottom is preferably perforated for the more ready passage of heat to the space or chamber surrounding the bowl. The form of these perforations $b^2$ may be circular, as shown in Fig. 4, or may be elongated and disposed near the edge of the bottom, as shown in Fig. 3. When the inner vessel or bowl is inclosed in a casing having a perforated bottom it will be seen that a more ready access is afforded for the introduction or generation of heat or steam in the space surrounding said inner vessel than is possible with a bottom not perforated. By this means the contents of said inner vessel may also be thoroughly heated without exposure to the direct action of the fire. If desired, however, the bottom may be entirely dispensed with and the bowl inclosed in the band B alone.

The utensil may be provided with a bail, C, which is attached by means of lugs $c$, formed on or secured to the inclosing band or casing.

I will be seen that when the parts of the utensil are connected the bowl A is held or locked securely in position, the engagement of the inwardly-turned flange or edge $b$ within the groove $a'$ and the pressure of said band against that portion of the bowl above the shoulder $a$ being such that the bowl is prevented from being moved up or down within the inclosing-band.

Having thus described my invention, what I claim as new, and desire to secure by Letters Patent, is—

1. The combination, with the bowl A, having annular shoulders $a\ a^2$ and groove $a'$, the circumference of the upper shoulder being greater than that of the lower one, of the band B, having an inwardly-bent upper edge, $b$, adapted to engage within the groove $a'$, whereby said parts are securely connected, substantially as described.

2. The herein-described vessel, consisting of the bowl A, having tapering sides, and provided near the top with annular shoulders and groove, and the casing B, having vertical walls and an inwardly-turned edge, $b$, adapted to engage with the annular groove formed in the bowl, said casing being provided with a bail, C, and having at its lower end an annular recess, $b'$, for the attachment of the perforated flanged bottom B', a space being left between the bowl and its casing for the circulation of heat, substantially as specified.

In testimony whereof I affix my signature in presence of two witnesses.

JOHN W. FISHER.

Witnesses:
 JNO. A. STOCKMAN,
 CHARLES P. WEBSTER.